US012615450B2

(12) United States Patent
Zuo et al.

(10) Patent No.: US 12,615,450 B2
(45) Date of Patent: Apr. 28, 2026

(54) COLUMN RAMP BUFFER DESIGN TO IMPROVE ADC RANGE IN CIS

(71) Applicant: OMNIVISION TECHNOLOGIES, INC., Santa Clara, CA (US)

(72) Inventors: Liang Zuo, Milpitas, CA (US); Hiroaki Ebihara, San Jose, CA (US); Jing Jun Yi, San Jose, CA (US); Rui Wang, San Jose, CA (US); Satoshi Sakurai, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 325 days.

(21) Appl. No.: 18/363,473

(22) Filed: Aug. 1, 2023

(65) Prior Publication Data

US 2025/0047995 A1 Feb. 6, 2025

(51) Int. Cl.
*H04N 25/677* (2023.01)
*H04N 25/766* (2023.01)
*H04N 25/772* (2023.01)

(52) U.S. Cl.
CPC ......... *H04N 25/677* (2023.01); *H04N 25/766* (2023.01); *H04N 25/772* (2023.01)

(58) Field of Classification Search
CPC .. H04N 25/677; H04N 25/766; H04N 25/772; H04N 25/78; H04N 5/3355; H04N 5/3745; H04N 5/37455; H04N 5/378; H03M 1/00–645
USPC .................................... 348/251; 341/155–172
See application file for complete search history.

(56) References Cited

U.S. PATENT DOCUMENTS

| | | | | |
|---|---|---|---|---|
| 8,553,112 B2 * | 10/2013 | Kawahito | ............ | H04N 25/616 |
| | | | | 348/241 |
| 9,307,173 B2 | 4/2016 | Takamiya | | |
| 10,826,470 B2 | 11/2020 | Zuo et al. | | |
| 2011/0134295 A1 * | 6/2011 | Shigeta | .................. | H04N 25/77 |
| | | | | 348/300 |
| 2011/0279723 A1 | 11/2011 | Takamiya et al. | | |
| 2015/0244388 A1 * | 8/2015 | Hashimoto | ............ | H04N 23/70 |
| | | | | 341/137 |
| 2018/0098037 A1 * | 4/2018 | Kumaki | ............... | H04N 23/667 |
| 2018/0219037 A1 * | 8/2018 | Nakamura | .......... | H10F 39/8023 |
| 2019/0253067 A1 * | 8/2019 | Sakai | .................. | H10F 39/8037 |

(Continued)

OTHER PUBLICATIONS

U.S. Appl. No. 18/363,469, filed Aug. 1, 2023, Ebihara et al.

*Primary Examiner* — Lin Ye
*Assistant Examiner* — Chan T Nguyen
(74) *Attorney, Agent, or Firm* — Dorsey & Whitney LLP

(57) ABSTRACT

An imaging system comprises a pixel array and readout circuitry coupled to the pixel array. The readout circuitry includes a ramp generator and a plurality of column unit cells, each comprising a column ramp buffer and a column comparator, and each column ramp buffer comprising an input node coupled to receive a ramp signal from the ramp generator, a transistor having a gate terminal coupled to the input node and a drain terminal coupled to a power line, an output node coupled between a source terminal of the transistor and the column comparator, and an alternating current (AC) coupling unit coupled between the input node and the transistor. The AC coupling unit comprises a capacitor coupled between the input node and the gate terminal of the transistor, and a reset switch coupled between the input node and the gate terminal of the transistor.

10 Claims, 10 Drawing Sheets

(56) References Cited

U.S. PATENT DOCUMENTS

| | | | |
|---|---|---|---|
| 2023/0247328 A1* | 8/2023 | Nakamoto | H04N 25/709 |
| | | | 348/300 |
| 2023/0254607 A1* | 8/2023 | Nakamoto | H04N 25/618 |
| | | | 348/207.99 |
| 2024/0214551 A1 | 6/2024 | Tabata | |
| 2025/0184632 A1* | 6/2025 | Shizu | H04N 25/67 |

* cited by examiner

COLUMN RAMP BUFFER DESIGN TO IMPROVE ADC RANGE IN CIS

TECHNICAL FIELD

This disclosure relates generally to image sensors, and in particular but not exclusively, relates to complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
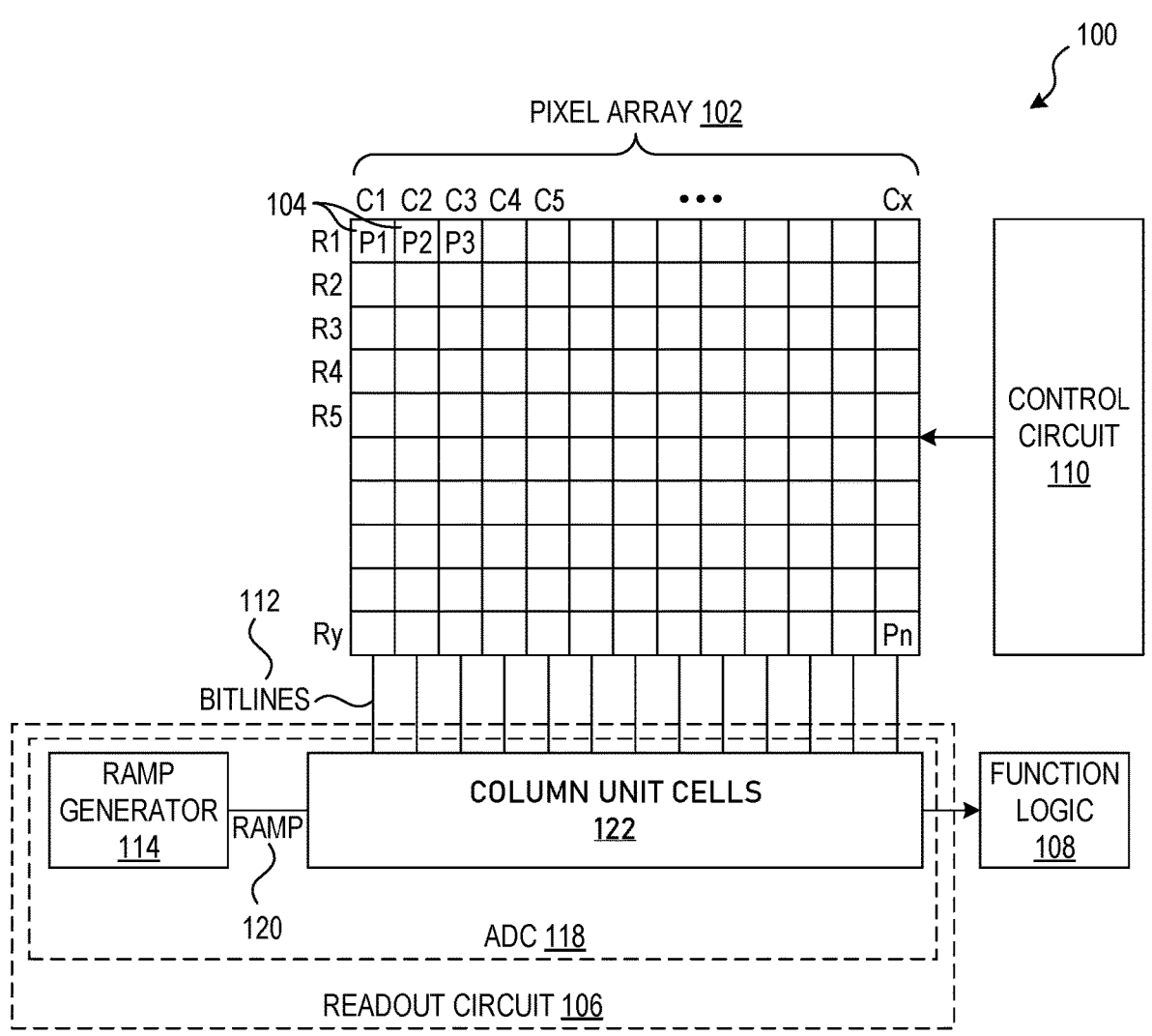
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with ramp buffers providing improved analog-to-digital conversion (ADC) range are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below." "over," "under," "above," "upper," "top." "bottom," "left," "right." "center," "middle," and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with ramp buffers providing improved analog-to-digital conversion (ADC) range are disclosed. In image sensors, the ADC range is an important value that determines whether the image sensor can achieve a large full well capacity. The ADC range can be affected by the pixel bitline signal range, the column ADC comparator operation range, the ramp generator output voltage range, the column ramp buffer output voltage range, etc. Moreover, in some cases, the voltage output by a power line to which a column ramp buffer is coupled is reduced in order to reduce power consumption, further limiting ADC range.

In various examples of the present disclosure, a column ramp buffer includes one or more alternating current (AC) coupling paths between the input and output. One or more switches can be toggled to control the path taken by a ramp signal and to boost the output voltage, thereby improving signal range and reducing process, voltage, and temperature (PVT) variation.

In various examples, an imaging system comprises a pixel array configured to generate a plurality of image charge voltage signals in response to incident light, and readout circuitry coupled to the pixel array. The readout circuitry includes a ramp generator configured to generate a ramp signal, and a plurality of column unit cells coupled to receive the ramp signal from the ramp generator and the image charge voltage signals from the pixel array. Each column unit cell comprises a column ramp buffer and a column comparator, and each column ramp buffer comprises an input node coupled to receive the ramp signal from the ramp generator, a transistor having a gate terminal coupled to the input node and a drain terminal coupled to a power line, an output node coupled between a source terminal of the transistor and the column comparator, and an alternating current (AC) coupling unit coupled between the input node and the transistor. The AC coupling unit comprises a capacitor coupled between the input node and the gate terminal of the transistor, and a reset switch coupled between the input node and the gate terminal of the transistor. The reset switch can be coupled to the capacitor in parallel.

In various examples, the AC coupling unit comprises a capacitor coupled between the input node and the gate terminal of the transistor, and a reset switch coupled between the gate terminal of the transistor and the power line.

In various examples, the AC coupling unit comprises a capacitor coupled between the input node and the gate terminal of the transistor, and a reset switch coupled between the gate terminal of the transistor and an adjustable bias voltage source.

To illustrate, FIG. 1 shows one example of an imaging system 100 having a readout circuit 106 including column unit cells 122 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image charge voltage signals through the column bitlines 112. As will be discussed, in the various examples, readout circuit 106 may include an analog-to-digital converter (ADC). As shown in the depicted example, the ADC 118 is coupled to column bitlines 112 and is configured to convert analog signals from column bitlines 112 to digital signals. In various examples, column amplifiers may also be included and may be coupled to column bitlines 112 to amplify the analog signals received from column bitlines 112 for conversion to digital signals by ADC 118. In various examples, the ADC 118 includes a ramp generator 114 and column unit cells 122. The ramp generator 114 has a ramp generator output from which a ramp signal is provided to the column unit cells 122 via a ramp signal line 120. In the example, the digital image data values generated by the column unit cells 122 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
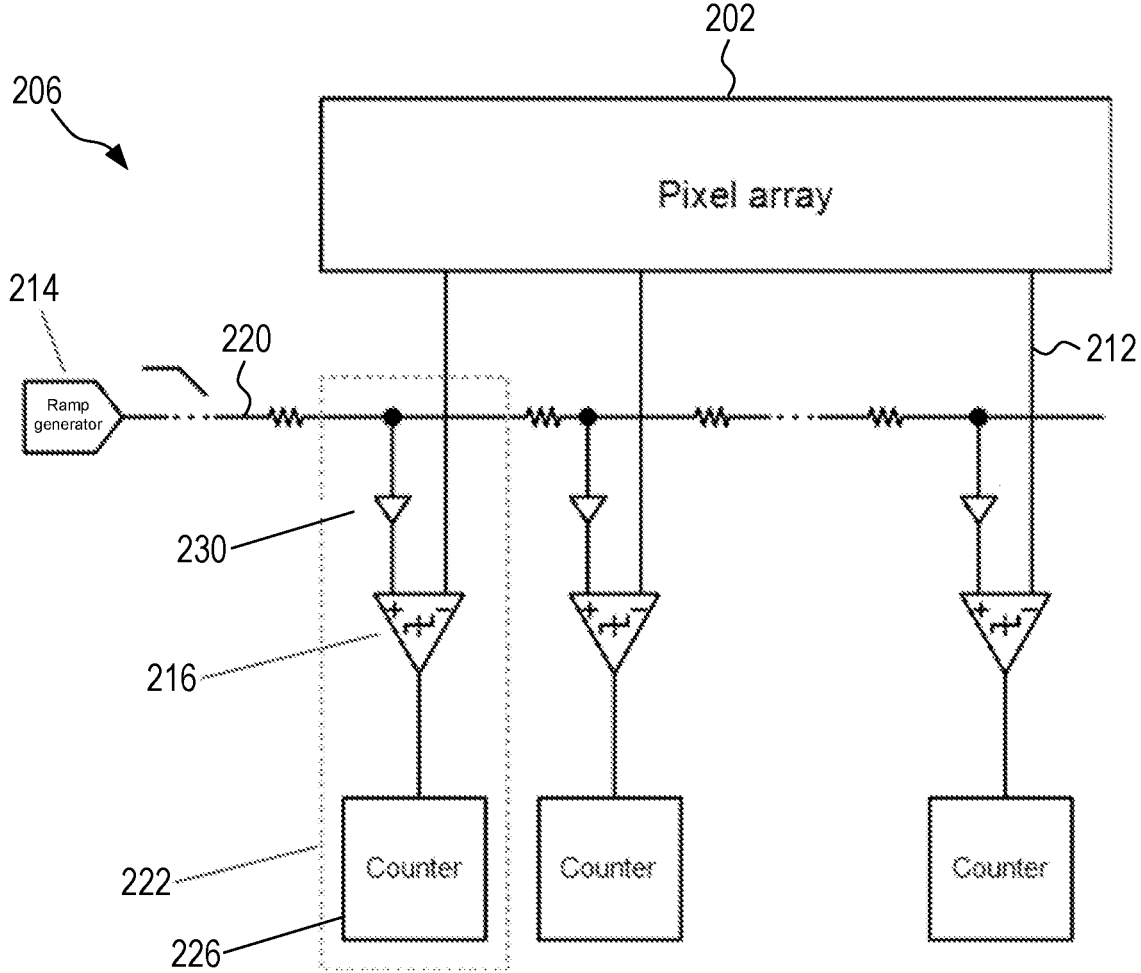
FIG. 2 illustrates a schematic of a portion of one example readout circuit in accordance with the teachings of the present disclosure.

FIG. 2 illustrates a schematic of a portion of one example readout circuit 206 in accordance with the teachings of the present disclosure. It is appreciated that the readout circuit 206 of FIG. 2 may be an example of the readout circuit 106 included in the imaging system 100 as shown in FIG. 1, and that similarly named and numbered elements described above are coupled and function similarly below.

The readout circuit 206 can include a global ramp generator 214 configured to generate a ramp signal. As shown in the depicted example, a ramp signal line 220 spans across the columns of pixel array 202 to provide the ramp signal to a plurality of column unit cells 222. Each column unit cell 222 can include a column comparator 216, a column counter 226, and a column ramp buffer 230. Each column comparator 216 can be coupled to receive an image charge voltage signal from a pixel array 202 via one of a plurality of bitlines 212, and the ramp signal from the ramp signal line 220 through one of the column ramp buffers 230. Each column comparator 216 can then compare the image charge voltage signal to the ramp signal and provide a digital representation of the image charge voltage signal in response. The output of each comparator 216 is coupled to one of the column counters 226 configured to be responsive to when the comparator 216 flips, indicating when the image charge voltage signal from the bitline 212 intersects the ramp signal from the ramp signal line 220.

Figure 3:
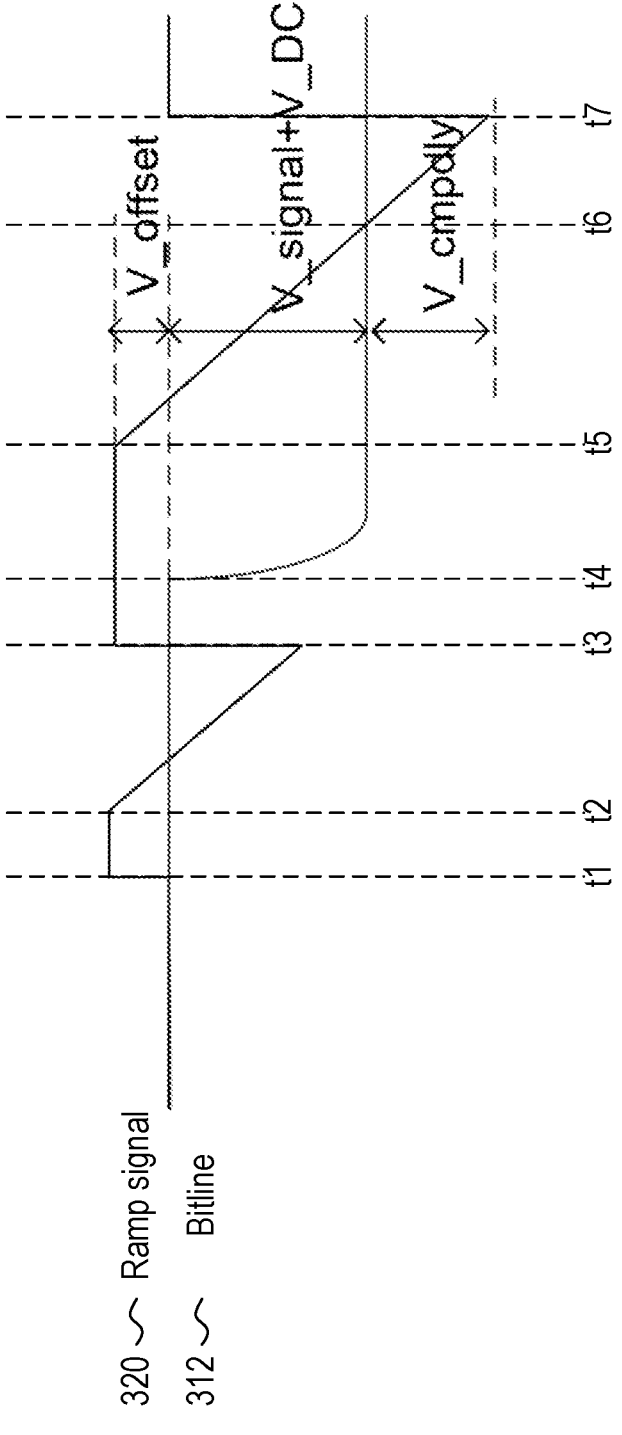
FIG. 3 illustrates a readout timing diagram of an example readout circuit in accordance with the teachings of the present disclosure.

FIG. 3 illustrates a readout timing diagram of an example readout circuit in accordance with the teachings of the present disclosure. It is appreciated that the timing diagram of FIG. 3 may be an example timing diagram of the readout circuit 206 as shown in FIG. 2, and that similarly named and numbered elements described above are coupled and function similarly below.

In the illustrated timing diagram, at t1, the ramp signal 320 is offset by an offset voltage V_offset in order to, for example, improve linearity of the ramp signal 320. Between times t2 and t3, the ramp signal 320 is ramped downward such that a reset level of a signal from the pixel array (e.g., the pixel array 202 in FIG. 2) can be read out. After the ramp signal 320 returns to the offset voltage V_offset at time t3, an image signal from the pixel array is read out through one or more bitlines 312 beginning at time t4. In various examples, the bitline 312 can carry both the image signal V_signal and a dark current signal V_dc. While the offset voltage V_offset is positive and the ramp signal 320 is ramped downward in the illustrated embodiment, the offset voltage V_offset can be negative and the ramp signal 320 can be ramped upward in other embodiments.

By time t5, the image signal on the bitline 312 has stabilized and the ramp signal 320 begins to ramp downward such that the image signal on the bitline 312 can be compared against the ramp signal 320 (e.g., by the comparators 216). In the illustrated embodiment, there is sufficient ADC range and the ramp signal 320 intersects the image signal on the bitline 312 at time t6. Between times t6 and t7, the ramp signal 320 can continue to be ramped as the comparator makes the comparison, resulting in an additional voltage difference V_cmpdly associated with comparator delay.

Therefore, in order to have sufficient ADC range, the ramp signal 320 received by a comparator may need to have a voltage range large enough to cover the sum of the offset voltage V_offset, the image signal V_signal, the dark current signal V_dc, and the comparator delay voltage difference V_cmpdly. Depending on the size of the image signal V_signal and other factors, this can be challenging for imaging systems that include conventional ramp buffers. Ramp buffers can be advantageously used to condition the ramp signal generated by a global ramp generator (e.g., the ramp generator 214) to be more suitable for use by downstream components. For example, ramp buffers can provide amplification, level shifting, and/or filtering of the ramp signal. However, the use of ramp buffers can also result in range loss compared to the ramp signal as provided by the global ramp generator. As will be described in further detail below, various examples of the present disclosure aim to improve ADC range by, for example, reducing the range loss through the ramp buffer.

Figure 4:
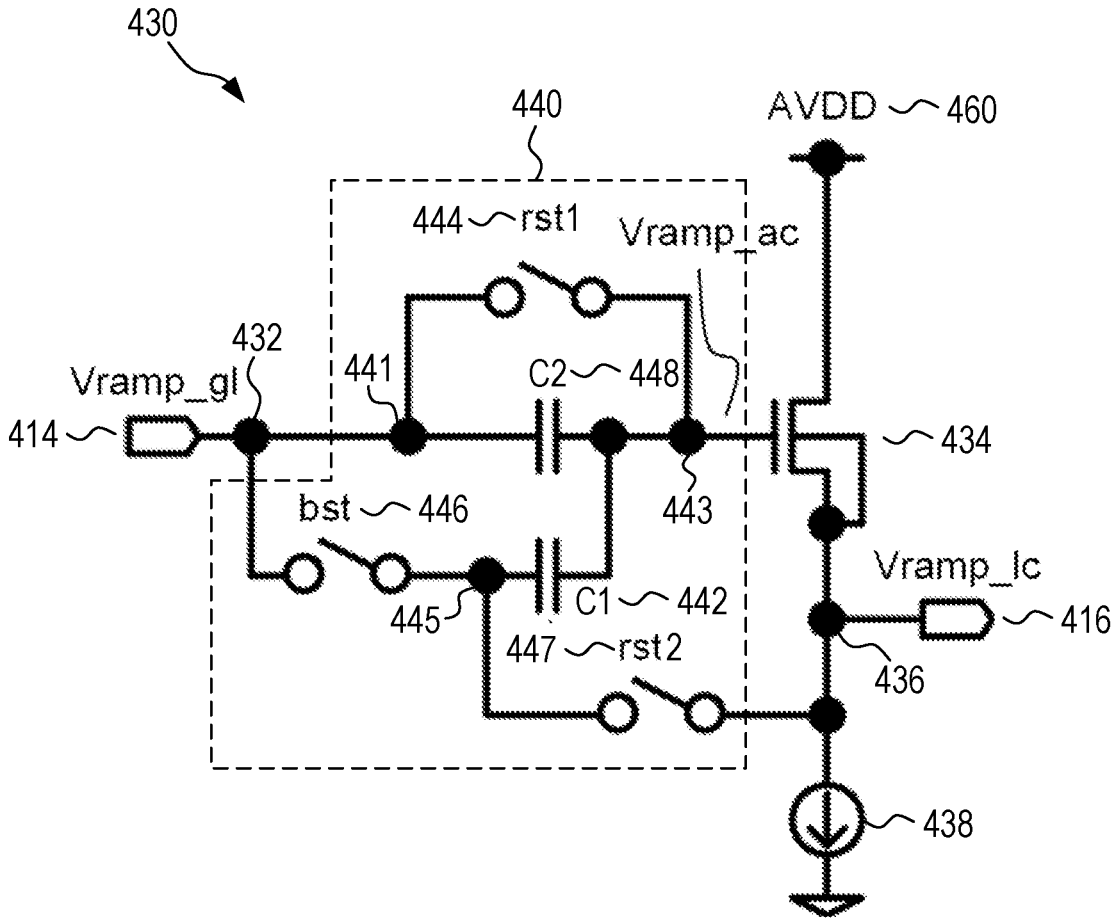
FIG. 4 illustrates a schematic of an example column ramp buffer in accordance with the teachings of the present disclosure.

FIG. 4 illustrates a schematic of an example column ramp buffer 430 in accordance with the teachings of the present disclosure. It is appreciated that the ramp buffer 430 of FIG. 4 may be an example of the ramp buffer 230 as shown in FIG. 2, and that similarly named and numbered elements described above are coupled and function similarly below.

The ramp buffer 430 can include an input node 432 coupled to receive a ramp signal generated by a global ramp generator 414. The voltage at the input node 432 can be represented as Vramp_gl. The ramp buffer 430 can also include a transistor 434 with a gate terminal coupled to the input node 432, a drain terminal coupled to a power line AVDD 460, a source terminal coupled to an output node 436, and a body terminal coupled to the source terminal. In various examples, the transistor 434 is a low threshold transistor (LVT). In various examples, the transistor 434 is either an NMOS or PMOS transistor. The output node 436 can be coupled to components downstream of the readout circuit, such as a comparator 416. The voltage at the output node 436 can be represented as Vramp_lc. The ramp buffer 430 can further include a current source 438 coupled between the output node 436 and ground. In examples in which the transistor 434 is a PMOS transistor, the power line AVDD 460 and ground can be swapped such that the drain terminal of the PMOS transistor 434 is coupled to ground and the current source 438 is coupled between the output node 436 and the power line AVDD 460.

The transistor 434 and/or the output node 436 can be coupled to the input node 432 through an alternating current (AC) coupling unit 440. The AC coupling unit 440 can include a first capacitor C1 442 coupled between the input node 432 and an AC coupling node 443. The AC coupling node 443 can be coupled to the gate terminal of the transistor 434. The voltage at the AC coupling node 443 can be represented as Vramp_ac. The AC coupling unit 440 can also include a first reset switch rst1 444 coupled between the AC coupling node 443 and a voltage source node 441. In the illustrated embodiment, the voltage source node 441 is coupled to the input node 432 such that the first reset transistor rst1 444 is coupled to the first capacitor C1 442 in parallel. In various examples, the voltage source node 441 can be coupled elsewhere, as will be described in further detail below with respect to FIGS. 6 and 7.

The AC coupling unit 440 can include a boost switch bst 446 coupled between the input node 432 and the first capacitor C1 442. The boost switch bst 446 and the first capacitor C1 442 define node 445 therebetween. The AC coupling unit 440 can also include a second reset switch rst2 447 coupled between the node 445 and the output node 436. The first and second reset switches rst1 444 and rst2 447 can be controlled independently (e.g., by two different switch control signals) or together (e.g., by a shared switch control signal). In various examples, the AC coupling unit 440 can further include a second capacitor C2 448 coupled between the input node 432 and an AC coupling node 443. In the illustrated embodiment, the second capacitor C2 448 is coupled to the first capacitor C1 442 in parallel and to the first reset switch rst1 444 also in parallel. In various examples, one or more of the first reset switch rst1 444, the second reset switch rst2 447, and the boost switch bst 446 can comprise transistors. As will be described in further detail below with respect to FIG. 5, by controlling the first reset switch rst1 444, the second reset switch rst2 447, and the boost switch bst 446, the AC coupling unit 440 can switch back and forth between a direct path and an AC coupling path for the ramp signal to travel across.

Figure 5:
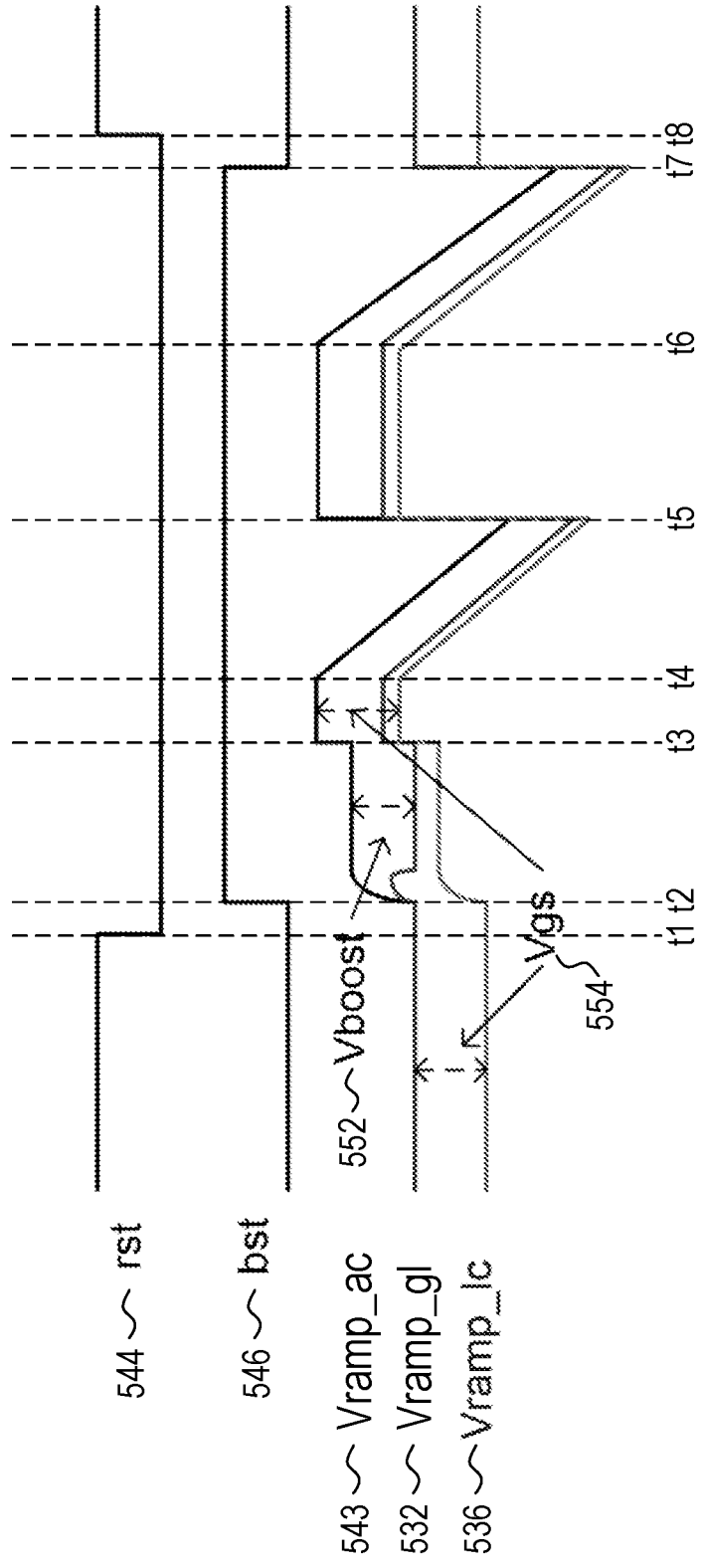
FIG. 5 illustrates a readout timing diagram of an example column ramp buffer in accordance with the teachings of the present disclosure.

FIG. 5 illustrates a readout timing diagram of an example column ramp buffer in accordance with the teachings of the present disclosure. It is appreciated that the timing diagram of FIG. 5 may be an example timing diagram of the ramp buffer 430 as shown in FIG. 4, and that similarly named and numbered elements described above are coupled and function similarly below.

In the illustrated timing diagram, a reset switch control signal rst 544 is configured to turn on prior to time t1 (e.g., at time t8 of the previous ADC cycle) and turn off at time t1.

In various examples, the reset switch control signal rst 544 can be used to control one or both of the first and second reset switches rst1 444 and rst2 447 illustrated in FIG. 4. A boost switch control signal bst 546 is configured to remain off until time t2. Referring to FIGS. 4 and 5 together, while the first reset switch rst1 444 is on and the boost switch bst 446 is off (i.e., prior to time t1), the first reset switch rst1 444 provides a direct path between the input node 432 and the AC coupling node 443. As a result, Vramp_gl 532 (i.e., the voltage level at the input node 432) and Vramp_ac 543 (i.e., the voltage level at the AC coupling node 443) are tied together.

At time t2, as the boost switch control signal bst 546 is turned on while the reset switch control signal rst 544 remains off, the ramp signal from the ramp generator 414 must travel through the AC coupling path formed by the first capacitor C1 442 (and, if present, the second capacitor C2 448). At this point, Vramp_gl is tied to the left plate of the first capacitor C1 442 (and, if present, the second capacitor C2 448) and Vramp_ac will be boosted by:

$$Vboost = Vgs * C\_2/(C\_1 + C\_2)$$

wherein Vgs is the gate-source voltage of the transistor 434, C_1 is the capacitance of the first capacitor C1 442, and C_2 is the capacitance of the second capacitor C2 448. In various examples, if both the first and second capacitors C1 442 and C2 448 are present and the capacitance C_1 is sufficiently larger than the capacitance C_2 (e.g., C2/(C1+C2)>=0.9), Vboost may exceed 0.22 V. In various examples, C_1 and C_2 can have a ratio of approximately 1:9 (e.g., C_1 and C_2 being 20 fF and 180 fF, respectively). In various examples, Vgs can range between 100 mV and 600 mV. In other embodiments, C_1, C_2, and Vgs can have other values depending on the constraints and demands of the imaging system. In various examples, the Vboost can also compensate for PVT variations of the transistor 434 to make the signal range more independent of the PVT variations.

As shown in FIG. 5, Vramp_ac 543 is boosted by Vboost 552 as the boost switch control signal bst 546 is turned on, and retains this difference from Vramp_gl 532 while the boost switch control signal bst 546 remains on until time t7. The gate-source voltage Vgs of the transistor 434, which is also the difference between Vramp_ac 543 and Vramp_lc 536, can remain constant such that boosting Vramp_ac 543 also boosts Vramp_lc 536. As shown in the examples below, this effectively boosts the range of Vramp_lc 536 (i.e., the difference between the highest and lowest voltage levels) and improves signal range of the ramp buffer 430. At time t3, the ramp signal is offset to, for example, improve linearity. Between times t4 and t5, a reset level is read out, and between times t6 and t7, an image signal is read out. At time t7, the boost switch control signal bst 546 is turned back off. At time t8, the reset switch control signal rst 544 is turned on for the next ADC cycle.

In various examples, the power line AVDD 460 illustrated in FIG. 4 can be configured to provide a voltage level of 2.8 V. The table below illustrates an example set of voltage values during the readout period.

| AVDD = 2.8 V | Before boost | After boost |
|---|---|---|
| V_signal (range) | 1 V | 1.1 V |
| V_ramp (range) | 2 V | 2.23 V |
| Vramp_gl High/Low | 2.4 V/0.4 V | 2.4 V/0.18 V |
| Vramp_lc High/Low | 2.15 V/0.15 V | 2.38 V/0.15 V |

As shown, the ramp signal range V_ramp (i.e., the difference between Vramp_lc High and Low) can be increased by 0.22 V while the image signal range V_signal can be increased by 0.1 V. Moreover, the voltage headroom of the current source 438 can be increased by 150 mV under PVT variation.

The power line AVDD 460 can be a significant source of power consumption. In various examples, the power line AVDD 460 can be configured to provide a lower voltage level of 2.2 V in order to save power. The table below illustrates an example set of voltage values during the readout period.

| AVDD = 2.2 V | Before boost | After boost |
|---|---|---|
| V_signal (range) | 0.7 V | 0.8 V |
| V_ramp (range) | 1.42 V | 1.65 V |
| Vramp_gl High/Low | 1.8 V/0.4 V | 1.8 V/0.18 V |
| Vramp_lc High/Low | 1.55 V/0.15 V | 1.78 V/0.15 V |

As shown, the ramp signal range V_ramp (i.e., the difference between Vramp_lc High and Low) can be increased by 0.22 V while the image signal range V_signal can be increased by 0.1 V. Moreover, the voltage headroom of the current source 438 can be fixed at 150 mV under PVT variation.

Figure 6:
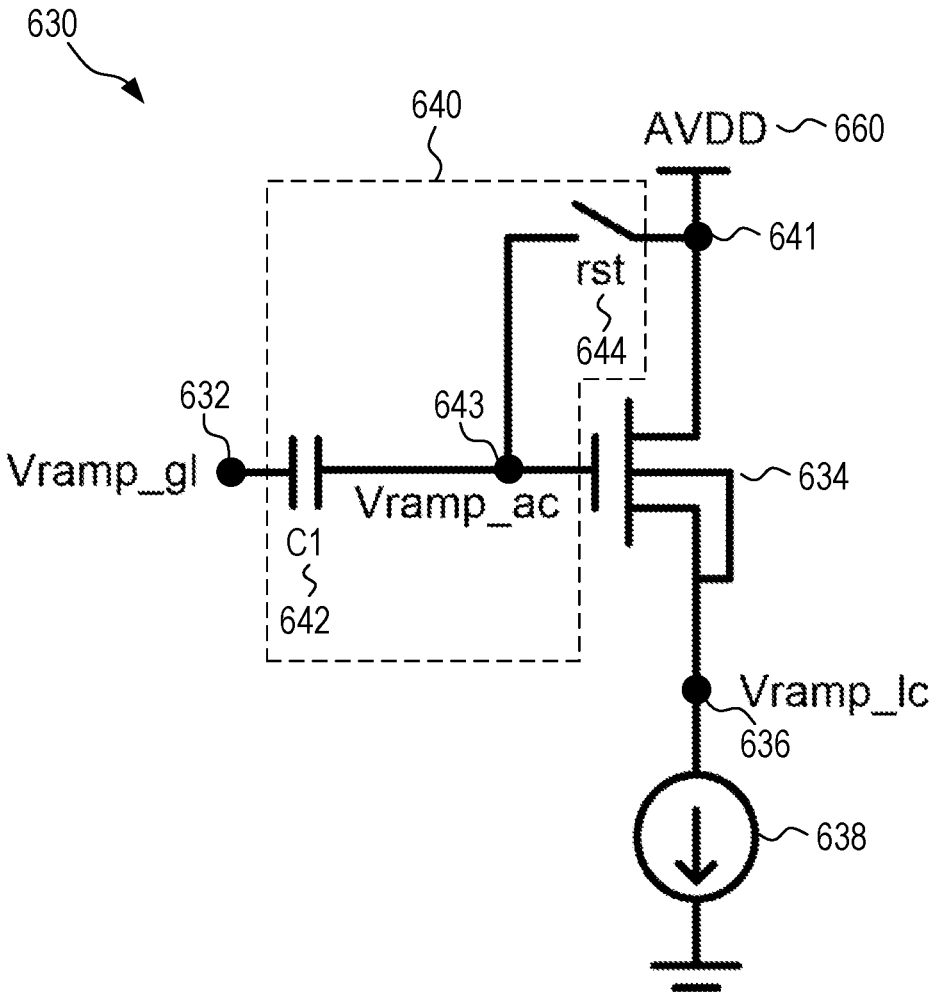
FIG. 6 illustrates a schematic of another example column ramp buffer in accordance with the teachings of the present disclosure.

FIG. 6 illustrates a schematic of another example column ramp buffer 630 in accordance with the teachings of the present disclosure. It is appreciated that the ramp buffer 630 of FIG. 6 may be an example of the ramp buffer 230 as shown in FIG. 2, and that similarly named and numbered elements described above are coupled and function similarly below.

The ramp buffer 630 can include an input node 632 coupled to receive a ramp signal generated by a global ramp generator (not shown). The voltage at the input node 632 can be represented as Vramp_gl. The ramp buffer 630 can also include a transistor 634 with a gate terminal coupled to the input node 632, a drain terminal coupled to a power line AVDD 660, a source terminal coupled to an output node 636, and a body terminal coupled to the source terminal. In various examples, the transistor 634 is a low threshold transistor (LVT). In various examples, the transistor 634 is either an NMOS or PMOS transistor. The output node 636 can be coupled to components downstream of the readout circuit (e.g., the comparator 216). The voltage at the output node 636 can be represented as Vramp_lc. The ramp buffer 630 can further include a current source 638 coupled between the output node 636 and ground. In examples in which the transistor 634 is a PMOS transistor, the power line AVDD 660 and ground can be swapped such that the drain terminal of the PMOS transistor 634 is coupled to ground and the current source 638 is coupled between the output node 636 and the power line AVDD 660.

The transistor 634 and/or the output node 636 can be coupled to the input node 632 through an alternating current (AC) coupling unit 640. The AC coupling unit 640 can include a capacitor C1 642 coupled between the input node 632 and an AC coupling node 643. The AC coupling node 643 can be coupled to the gate terminal of the transistor 634. The voltage at the AC coupling node 643 can be represented as Vramp_ac. The AC coupling unit 640 can also include a reset switch rst 644 coupled between the AC coupling node 643 and a voltage source node 641. In the illustrated embodiment, the voltage source node 641 is coupled to the power line AVDD 660.

In various examples, the reset switch rst 644 can comprise a transistor. In various examples, the upper bound of Vramp_ac may be AVDD+0.1V, and as such in order to avoid leakage through the reset switch rst 644, the body terminal of the reset switch 644 can be coupled to another power line that provides a voltage level that is higher than the voltage level provided by the power line AVDD 660. While the ramp buffer 630 is not PVT invariant, it can have a sufficient voltage range.

Figure 7:
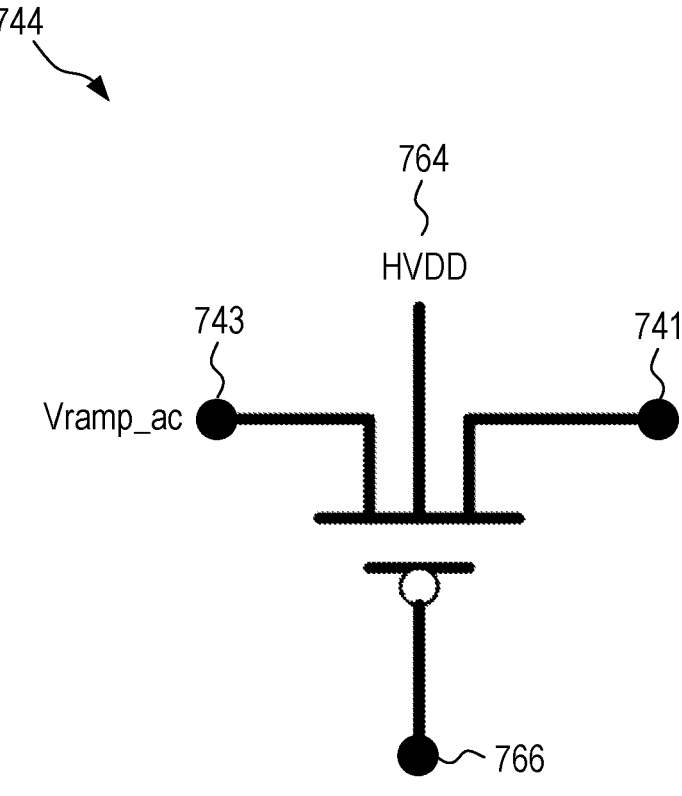
FIG. 7 illustrates an example reset switch included in a column ramp buffer in accordance with the teachings of the present disclosure.

FIG. 7 illustrates an example reset switch 744 included in a column ramp buffer in accordance with the teachings of the present disclosure. It is appreciated that the reset switch 744 of FIG. 7 may be an example of the reset switch 644 as shown in FIG. 6, and that similarly named and numbered elements described above are coupled and function similarly below.

In the illustrated embodiment, the reset switch 744 is a PMOS transistor with a source terminal coupled to a voltage source node 741, a drain terminal coupled to an AC coupling node 743, a gate terminal coupled to a control signal node 766, and a body terminal coupled to power line HVDD. The voltage source node 741 can be coupled to a different power line (e.g., power line AVDD 660). The AC coupling node 743 can be coupled to a gate terminal of another transistor (e.g., the transistor 634) and have a voltage level Vramp_ac. The control signal node 766 can be coupled to receive a reset switch control signal for controlling the reset switch 744. In various examples, power line HVDD can be configured to provide a higher voltage level than another power line (e.g., power line AVDD 660) in the column ramp buffer, which can reduce or prevent leakage through the reset switch 744.

Figure 8:
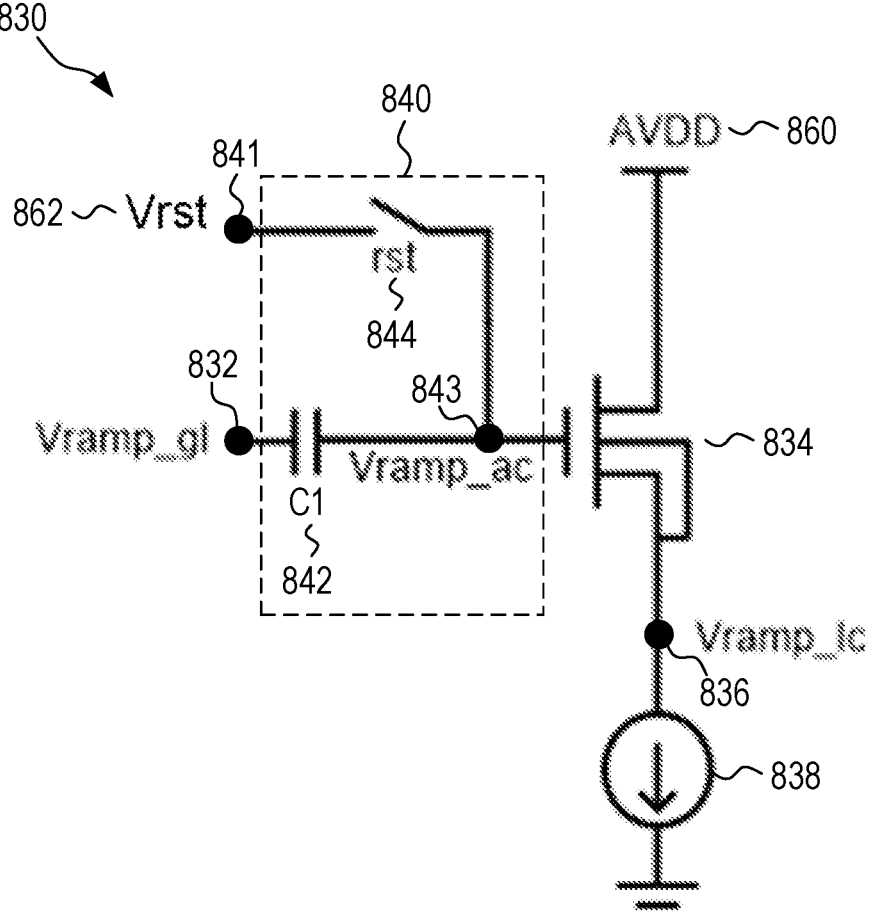
FIG. 8 illustrates a schematic of another example column ramp buffer in accordance with the teachings of the present disclosure.

FIG. 8 illustrates a schematic of another example column ramp buffer 830 in accordance with the teachings of the present disclosure. It is appreciated that the ramp buffer 830 of FIG. 8 may be an example of the ramp buffer 230 as shown in FIG. 2, and that similarly named and numbered elements described above are coupled and function similarly below.

The ramp buffer 830 can include an input node 832 coupled to receive a ramp signal generated by a global ramp generator (not shown). The voltage at the input node 832 can be represented as Vramp_gl. The ramp buffer 830 can also include a transistor 834 with a gate terminal coupled to the input node 832, a drain terminal coupled to a power line AVDD 860, a source terminal coupled to an output node 836, and a body terminal coupled to the source terminal. In various examples, the transistor 834 is a low threshold transistor (LVT). In various examples, the transistor 834 is either an NMOS or PMOS transistor. The output node 836 can be coupled to components downstream of the readout circuit (e.g., the comparator 216). The voltage at the output node 836 can be represented as Vramp_lc. The ramp buffer 830 can further include a current source 838 coupled between the output node 836 and ground.

The transistor 834 and/or the output node 836 can be coupled to the input node 832 through an alternating current (AC) coupling unit 840. The AC coupling unit 840 can include a capacitor C1 842 coupled between the input node 832 and an AC coupling node 843. The AC coupling node 843 can be coupled to the gate terminal of the transistor 834. The voltage at the AC coupling node 843 can be represented as Vramp_ac. The AC coupling unit 840 can also include a reset switch rst 844 coupled between the AC coupling node 843 and a voltage source node 841. In the illustrated embodiment, the voltage source node 841 is coupled to a bias voltage source Vrst 862. In various examples, the bias voltage source Vrst 862 can be adjusted such that leakage through the reset switch rst 844 is not excessive while still providing a sufficient voltage range.

Figure 9:
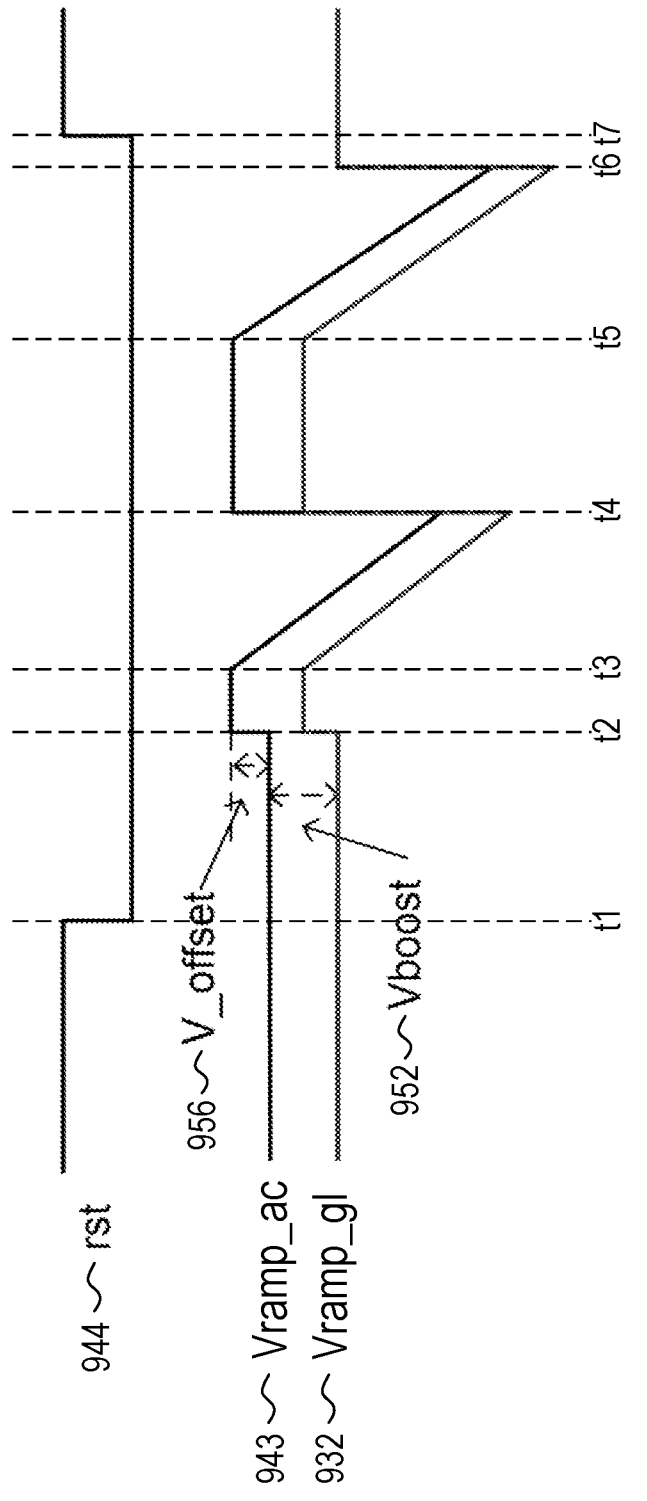
FIG. 9 illustrates a readout timing diagram of another example column ramp buffer in accordance with the teachings of the present disclosure.

FIG. 9 illustrates a readout timing diagram of another example column ramp buffer in accordance with the teachings of the present disclosure. It is appreciated that the timing diagram of FIG. 9 may be an example timing diagram of the ramp buffers 630 and 830 as shown in FIGS. 6 and 8, respectively, and that similarly named and numbered elements described above are coupled and function similarly below.

In the illustrated timing diagram, a reset switch control signal rst 944 can be used to control a reset switch (e.g., the reset switch 644 or 844). The reset switch control signal rst 944 can be configured to turn on prior to time t1 (e.g., at time t7 of the previous ADC cycle) and turn off at time t1. Referring to FIGS. 6, 8, and 9 together, while the reset switch control signal rst 944 is high, the reset switch rst 644/844 provides a direct path between the AC coupling node 643/843 and either the power line AVDD 660 or the bias voltage source Vrst 862. As a result, Vramp_ac 943 (e.g., the voltage level at the AC coupling node 643/843) and the voltage level provided by either the power line AVDD 660 or the bias voltage source Vrst 862 are tied together.

Therefore, Vramp_ac 943 can be at AVDD 660 or Vrst 862 at time t1, and jump to AVDD+V_offset 956 or Vrst+V_offset 956 at time t2. In various examples, V_offset can be set to approximately 0.1 V. Vramp_ac 943 and Vramp_gl 932 can remain separated by Vboost 952 accordingly. The tables below illustrate example sets of voltage values during the readout period for the ramp buffer 830 shown in FIG. 8 when Vrst is set to Vramp_gl at t1+0.225V and AVDD 660 provides a voltage of 2.8 V (minimum 2.6 V) and 2.2 V (minimum 2 V), respectively.

| AVDD = 2.8 V (min 2.6 V) | Before boost | After boost |
|---|---|---|
| V_signal (range) | 1 V | 1.1 V |
| V_ramp (range) | 2 V | 2.23 V |
| Vramp_gl High/Low | 2.4 V/0.4 V | 2.4 V/0.18 V |
| Vramp_lc High/Low | 2.15 V/0.15 V | 2.38 V/0.15 V |

| AVDD = 2.2 V (min 2 V) | Before boost | After boost |
|---|---|---|
| V_signal (range) | 0.7 V | 0.8 V |
| V_ramp (range) | 1.42 V | 1.65 V |
| Vramp_gl High/Low | 1.8 V/0.4 V | 1.8 V/0.18 V |
| Vramp_lc High/Low | 1.55 V/0.15 V | 1.78 V/0.15 V |

It is noted that the Vramp_lc High value after the boost can correspond to Vrst+V_offset-Vgs.

Figure 10:
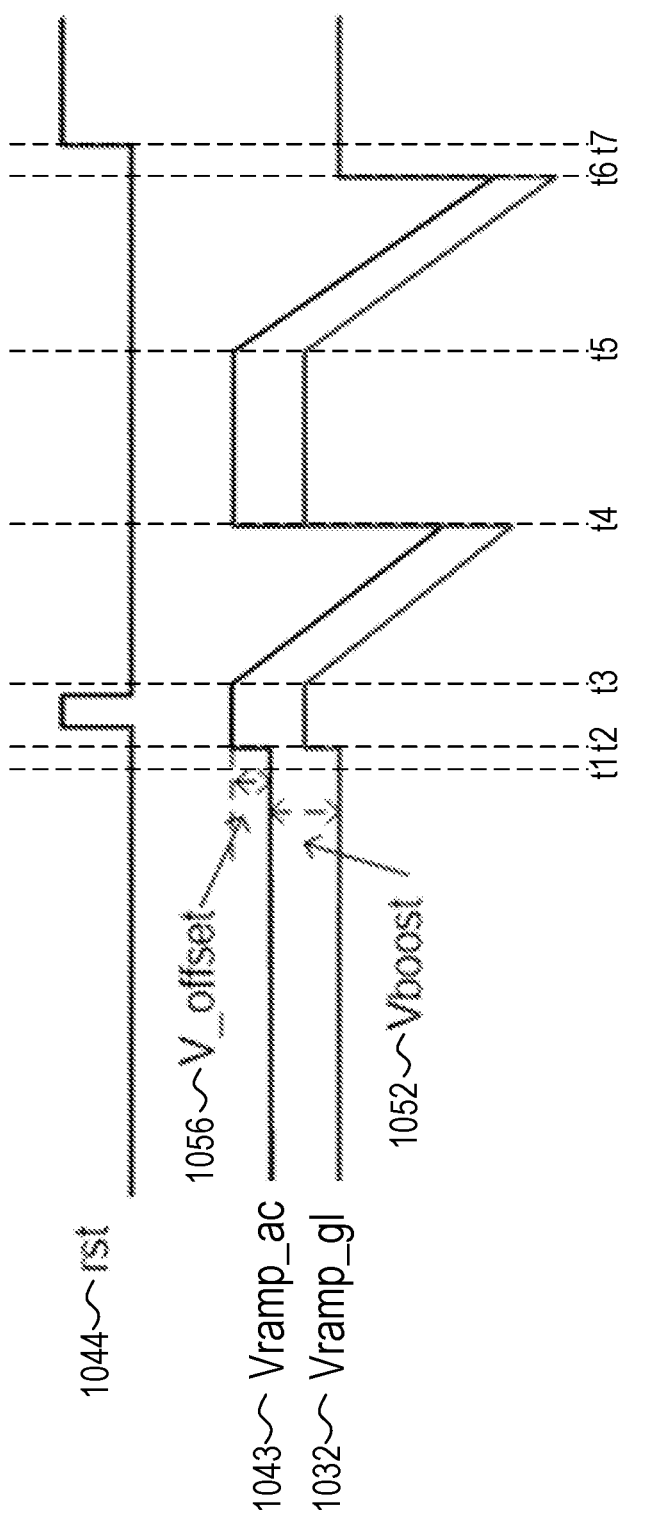
FIG. 10 illustrates a readout timing diagram of another example column ramp buffer in accordance with the teachings of the present disclosure.

FIG. 10 illustrates a readout timing diagram of another example column ramp buffer in accordance with the teachings of the present disclosure. It is appreciated that the timing diagram of FIG. 10 may be an example timing diagram of the ramp buffers 630 and 830 as shown in FIGS. 6 and 8, respectively, and that similarly named and numbered elements described above are coupled and function similarly below.

In the illustrated timing diagram, a comparator (e.g., the comparator 216) can be auto-zeroed at time t1. At time t2, the ramp signal can be offset by V_offset 1056 for improving linearity. Afterward, a reset switch control signal rst 1044 can be pulsed between times t2 and t3 to toggle a reset switch (e.g., the reset switch 644 or 844) on and off. Referring to FIGS. 6, 8, and 10 together, while the reset switch control signal rst 1044 is high, the reset switch rst 644/844 provides a direct path between the AC coupling node 643/843 and either the power line AVDD 660 or the bias voltage source Vrst 862. As a result, Vramp_ac 1043 (e.g., the voltage level at the AC coupling node 643/843) and the voltage level provided by either the power line AVDD 660 or the bias voltage source Vrst 862 are tied together while the reset switch control signal rst 1044 is pulsed and/or Vramp_ac is at its maximum voltage level (i.e., between times t2 and t3, and/or between times t4 and t5).

Accordingly, it may become unnecessary to couple the body terminal of the reset switch 644 to another power line that provides a voltage level that is higher than the voltage level provided by the power line AVDD 660, as discussed above with respect to FIG. 6. Vramp_ac 1043 and Vramp_gl 1032 can remain separated by Vboost 1052. The tables below illustrate example sets of voltage values during the readout period for the configuration shown in FIG. 8 when Vrst is set to Vramp_gl at t2~t3+0.225V and AVDD 660 provides a voltage of 2.8 V (minimum 2.6 V) and 2.2 V (minimum 2 V), respectively.

| AVDD = 2.8 V (min 2.6 V) | Before boost | After boost |
|---|---|---|
| V_signal (range) | 1 V | 1.1 V |
| V_ramp (range) | 2 V | 2.23 V |
| Vramp_gl High/Low | 2.4 V/0.4 V | 2.4 V/0.18 V |
| Vramp_lc High/Low | 2.15 V/0.15 V | 2.38 V/0.15 V |

| AVDD = 2.2 V (min 2 V) | Before boost | After boost |
|---|---|---|
| V_signal (range) | 0.7 V | 0.8 V |
| V_ramp (range) | 1.42 V | 1.65 V |
| Vramp_gl High/Low | 1.8 V/0.4 V | 1.8 V /0.18 V |
| Vramp_lc High/Low | 1.55 V/0.15 V | 1.78 V/0.15 V |

It is noted that the Vramp_lc High value after the boost can correspond to Vrst-Vgs.

The above description of illustrated examples of the disclosure, including the tables above and what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An imaging system, comprising:
a pixel array configured to generate a plurality of image charge voltage signals in response to incident light; and
readout circuitry coupled to the pixel array, the readout circuitry including a ramp generator configured to generate a ramp signal, and a plurality of column unit cells coupled to receive the ramp signal from the ramp generator and the image charge voltage signals from the pixel array, wherein each column unit cell comprises a column ramp buffer and a column comparator, and wherein each column ramp buffer comprises:
an input node coupled to receive the ramp signal from the ramp generator;
a transistor having a gate terminal coupled to the input node and a drain terminal coupled to a power line;
an output node coupled between a source terminal of the transistor and the column comparator; and
an alternating current (AC) coupling unit coupled between the input node and the transistor, the AC coupling unit comprising:
a capacitor coupled between the input node and the gate terminal of the transistor; and
a reset switch coupled between the input node and the gate terminal of the transistor, wherein the reset switch is coupled to the capacitor in parallel.

2. The imaging system of claim 1, wherein the AC coupling unit further comprises a boost switch coupled between the input node and the capacitor.

3. The imaging system of claim 2, wherein the reset switch is configured to be switched off at a first time, wherein the boost switch is configured to be switched on at a second time after the first time, and wherein the ramp generator is configured to generate the ramp signal at a third time after the second time.

4. The imaging system of claim 3, wherein the ramp generator is configured to cease generating the ramp signal at a fourth time after the third time, wherein the boost switch is configured to be switched off at the fourth time, and wherein the reset switch is configured to be switched on at a fifth time after the fourth time.

5. The imaging system of claim 1, wherein the reset switch is a first reset switch, and wherein the AC coupling unit further comprises a second reset switch coupled between the capacitor and the output node.

6. The imaging system of claim 5, wherein the first reset switch and the second reset switch are configured to be controlled by a shared reset control signal.

7. The imaging system of claim 1, wherein the reset switch is a first reset switch, and wherein the AC coupling unit further comprises:
a boost switch coupled between the input node and the capacitor;
a boost node coupled between the boost switch and the capacitor; and
a second reset switch coupled between the boost node and the output node.

8. The imaging system of claim 1, wherein the capacitor is a first capacitor, and wherein the AC coupling unit further comprises:
a second capacitor coupled between the input node and the gate terminal of the transistor.

9. The imaging system of claim 8, wherein the second capacitor is coupled to the first capacitor in parallel, and wherein the second capacitor is coupled to the reset switch in parallel.

10. The imaging system of claim 1, wherein each column ramp buffer further comprises a current source coupled between the output node and ground.

* * * * *